J. E. HALE.
VEHICLE WHEEL RIM.
APPLICATION FILED NOV. 10, 1911.
1,028,109.
Patented June 4, 1912.
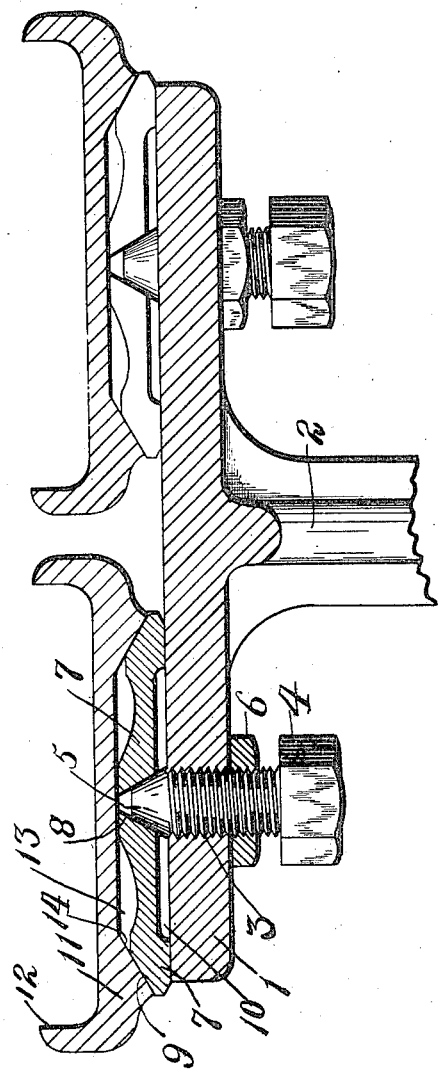

UNITED STATES PATENT OFFICE.

JAMES ELLIS HALE, OF AKRON, OHIO, ASSIGNOR TO THE GOODYEAR TIRE AND RUBBER COMPANY, OF AKRON, OHIO, A CORPORATION OF OHIO.

VEHICLE WHEEL-RIM.

1,028,109.   Specification of Letters Patent.   Patented June 4, 1912.

Application filed November 10, 1911. Serial No. 659,575.

*To all whom it may concern:*

Be it known that I, JAMES ELLIS HALE, a citizen of the United States, residing at Akron, in the county of Summit and State of Ohio, have invented new and useful Improvements in Vehicle Wheel-Rims, of which the following is a specification.

This invention relates to improvements in vehicle wheel rims, and has especial relation to means for detachably mounting a tire-bearing rim on a wheel-rim.

Wheels as now commonly constructed for vehicles, and especially for automobile trucks, are made in standard sizes and comprise a rim having a flat outer face to receive the tire-bearing demountable rim; and this invention contemplates the provision of suitable means for securely mounting the tire-carrying rim on the vehicle wheel rim in such a manner that it may be readily removed and replaced when desired to enable the user of the vehicle to substitute a tire-rim carrying a fresh tire at any time without the requirement of especial tools or any unnecessary delay by substituting for the rim carrying an old tire, a rim carrying a fresh tire.

The invention contemplates the provision of a pair of split contractible bands adapted to be mounted on the vehicle wheel rim and provided with inclined side faces, around which is mounted the wheel-carrying rim having a groove in its inner surface provided with inclined portions to engage the inclined portions of said split rings. The arrangement is such that when the split rings are shifted laterally away from each other the inclined portions of the rings engage the inclined faces of the tire-carrying rim with a wedging action for securely holding the latter against movement. The means which I prefer to employ for shifting the split rings laterally away from each other consists of a plurality of threaded elements extending through suitable apertures in the wheel-rim having outwardly-projecting conically-shaped ends to engage suitably inclined portions of the two rings for forcing them apart.

With the foregoing and other objects in view, the invention consists in the novel construction, combination and arrangement of parts constituting the invention to be hereinafter specifically described and illustrated in the accompanying drawing which forms a part hereof wherein is shown the preferred embodiment of the invention, but it is to be understood that changes, variations and modifications can be resorted to which come within the scope of the claims hereunto appended.

The drawing presented is a transverse sectional view of the rim portion of a vehicle wheel showing portions of the mechanism for supporting the tire-carrying rim in section.

Referring to the drawings in detail the reference numeral 1 indicates the rim of a vehicle wheel supported by spokes 2. The outer face of the rim 1 is preferably flat and is further provided with a plurality of spaced threaded apertures 3 arranged in a series, extending circumferentially around the rim. Mounted in these apertures are screws 4 provided with outwardly-extending conically-shaped ends 5 and these screws are locked against rotation by means of lock or jam-nuts 6. Mounted on the outer face of the rim 1 are a pair of split rings 7 having the lateral opposing faces 8 thereof inclined as shown to form an annular recess arranged to receive the conical heads 5 of the bolts 4. The lateral faces 9 of the rings 7 are inclined as shown and for the purpose of lightness the inner faces of the rings 7 are provided with grooves 10. Mounted on the rings 7 is an annular endless tire-carrying rim 11, usually, although not necessarily, provided with flanges 12 and provided in its inner face with a groove 13 the lateral walls 14 of which are inclined with an inclination approximately equivalent to the inclination of the side walls 9 of the ring 7, so that the rim incloses and seats on the inclined faces 9 of the rings 7.

In assembling a wheel for use embodying this invention the screws 4 are withdrawn sufficiently to leave the outer face of the rim 1 unobstructed, after which the rings 7 are seated in the groove 13 of the rim 11 and then shifted laterally to place after which the screws are manipulated to cause their conical heads 5 to move outwardly into the annular recess formed between the opposing faces 8 of the rings 7, in doing this the wedging action of the heads 5 causes a lateral shifting of the rings 7 in opposite directions thereby securely locking the rim 11 against movement and at the same time contracting the rings 7 snugly onto the outer face or the rim 1. The removal of the rim 11 is effected by reversing the foregoing operation.

It will be pointed out that the employment of the elements 4, having conical heads 5 engaging the opposing walls 8 of the rings 7 also serves to support the central portion of the rim 11, which is highly desirable where a tire having a hard rubber base is used which is liable to be fractured by any movement such as bending or flexing of the rim, in which the tire is seated.

I claim:

1. The combination with a vehicle wheel-rim provided with a series of radial openings arranged circumferentially of said rim, a pair of split expansible rings mounted on said rim, the outer lateral faces of which are inclined and with their opposing faces outwardly converging to provide a circumferentially-extending frusto-conically-shaped recess between them, radially movable means mounted in the openings in said rim and projecting into said recess for forcing said rings laterally away from each other, and a tire-carrying rim provided in its inner face with a shallow frusto-conically-formed groove adapted to be mounted on said rings and to be held securely on said rim when said rings are laterally forced away from each other to bring their inclined portions into engagement with the inclined edges of the groove in said tire-carrying rim.

2. The combination with a vehicle wheel rim of a pair of laterally-shiftable split expansible rings mounted thereon and spaced from each other to provide between them a circumferentially-extending recess, radially-movable wedging means carried by said rim and adapted to project into said recess for forcing said rings laterally away from each other, an endless tire-carrying rim inclosing said rings and provided in its inner face with inclined portions complementary to the lateral faces of said rings and adapted to be engaged thereby when the latter are forced apart to lock said tire-carrying rim detachably in place and simultaneously contract said rings on the outer face of said wheel-rim.

In testimony whereof I have hereunto set my hand in presence of two subscribing witnesses.

JAMES ELLIS HALE.

Witnesses:
OTTO W. MYERS,
W. G. HARRIS.